Jan. 26, 1971  C. SCHMITZ  3,557,553
STRUCTURAL PART OF A GAS TURBINE DRIVE UNIT WHICH IS
EXPOSED TO THERMAL LOAD AND IS TO BE COOLED
BY MEANS OF A GAS
Filed Aug. 30, 1968

INVENTOR
CHRISTIAN SCHMITZ

BY *Craig D Antonelli*

ATTORNEYS

United States Patent Office 3,557,553
Patented Jan. 26, 1971

3,557,553
STRUCTURAL PART OF A GAS TURBINE DRIVE UNIT WHICH IS EXPOSED TO THERMAL LOAD AND IS TO BE COOLED BY MEANS OF A GAS
Christian Schmitz, Engelberg, Post Schorndorf, Wurttemberg, Germany, assignor to Daimler-Benz Aktiengesellschaft, Stuttgart-Unterturkheim, Germany
Filed Aug. 30, 1968, Ser. No. 756,646
Claims priority, application Germany, Aug. 31, 1967, 1,626,032
Int. Cl. F02c 7/00
U.S. Cl. 60—39.65           3 Claims

ABSTRACT OF THE DISCLOSURE

A gas turbine drive unit in which a part thereof, that is exposed to high thermal loads and is to be cooled by gas, consists of a high-heat-resistant steel material, reduced to fibers, compressed to sheet metal thickness under the action of heat and possessing porous properties.

Figure 1:
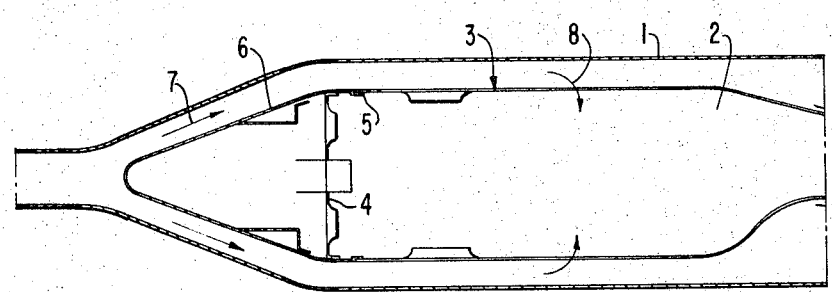

The present invention relates to a part of a gas turbine drive unit, exposed to thermal loads and to be cooled by means of a gas, for example, by means of air, and more particularly to a mixing skirt or shell in combustion chambers.

With the development of gas-turbine drive units having high operating temperatures, in addition to the selection of the materials, also the adequate cooling of the thermally highly loaded parts, especially the cooling of the mixing skirt or shell entails considerable constructive difficulties and also difficulties in the manufacture. Special structural expenditures had to be made heretofore which affect the entire weight of the drive unit.

The aim of the present invention resides in overcoming these difficulties. According to the present invention, the underlying problems are solved in that the thermally highly loaded part which is to be cooled with air or gas, consists of a high-heat-resistant steel material, reduced to fibrous form and compressed under heat interaction to sheet metal thickness, which possesses porous properties.

For example, the mixing skirt or shell of a combustion chamber can be constructed uninterruptedly smooth by the use of the fibrous steel material compressed to sheet metal thickness. Special measures for the supply of cooling air become superfluous because the cooling air penetrates through the porous material and a transpiration cooling is achieved in an advantageous manner. The weight of the mixing skirt is quite considerably reduced because the specific weight of the material of the present invention lies considerably below that of usual sheet metal plates. Additionally, one is able to match the cooling action in the different temperature zones to the respective requirements by appropriate selection of the porosity in the material. The working of the material offers no difficulties because it can be welded to the remaining materials of the drive unit without any further measure, for example, by electron beam welding.

According to a further feature of the present invention, the porosity of the fibrous steel material, which possesses a continuously uniform porosity, in its initially supplied condition can be made different either continuously or stepwise by an additional mechanical treatment, for example, by rolling, so that an individual adaptation to the respective requirements is possible. For the same purpose, the porosity can be made different by a selection of the fiber dimensions and/or the concentration per surface unit, so as to form a mat.

Accordingly, it is an object of the present invention to provide a thermally highly loaded part of a gas turbine drive unit which can be readily cooled to the desired extent by means of a gas, yet avoids by extremely simple means the aforementioned shortcomings and drawbacks encountered in the prior art.

Another object of the present invention resides in a highly thermally loaded part of a gas turbine drive unit which is to be cooled by means of a gas and which eliminates difficulties from a constructive and manufacturing point of view without involving high expenditures.

A further object of the present invention resides in a gas-turbine drive unit made from such material in the mixing chamber or skirt thereof as dispenses with special measures for the supply of cooling air while at the same time reducing the over-all weight of the unit.

Still a further object of the present invention resides in a gas-turbine drive unit of the type described above, in which an individual adaptation of the different sections to the prevailing requirements as regards cooling is readily possible.

Figure 2:
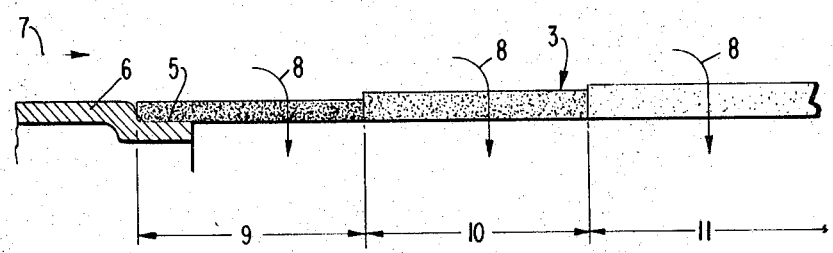

These and further objects, features and advantages of the present invention will become more obvious from the following description when taken in connection with the accompanying drawing which shows, for purposes of illustration only, one embodiment in accordance with the present invention, and wherein:

FIG. 1 is a somewhat schematic cross-sectional view through a combustion chamber of a gas-turbine drive unit embodying the present invention; and FIG. 2 is a partial longitudinal cross-sectional view, on a greatly enlarged scale, through the mixing skirt of the combustion chamber of FIG. 1 in accordance with the present invention.

Referring now to the drawing wherein like reference numerals are used in the two views to designate like parts, reference numeral 1 designates the outer casing or jacket which surrounds the combustion chamber 2 of an otherwise conventional gas-turbine drive unit (not shown).

In this combination chamber 2, the mixing skirt generally designated by reference numeral 3 consists in its section adjoining the holder 4 for the fuel injection installation, of a fibrous steel material compressed to sheet metal thickness under heat influence which possesses porous properties. The mixing skirt 3 is welded at 5 onto the part 6 of the combustion chamber 2 by means of electron beam welding.

Air, which is under pressure and which flows in the direction of arrow 7 between the outer jacket 1 and the combustion chamber 2, enters in the direction of arrow 8 through the pores provided in the mixing skirt 3 into the combustion chamber 2 and effects in an advantageous manner a transpiration cooling.

As can be seen more particularly from FIG. 2, the cooling of the mixing skirt 3 is controlled in that the mixing skirt is provided with matted areas of differing porosity in the fibrous steel material. The varying porosity is achieved, for example, by subsequent rolling of the fibrous steel material. The smallest porosity exists within the area 9 of the mixing skirt 3, as a result of a stronger rolling of the fibrous steel material. As a result of a less strong rolling in the adjoining area 10, the porosity is larger thereat than in the area 9 while within the area 11, which is not subjected to subsequent rolling operation, there exists the original porosity of the fibrous steel material.

Typical characteristics for a fibrous steel material compressed to sheet metal thickness are, for example, as follows:

Physical dimensions:
  Diameter of the fibers: about 0.1 to 2.0 mm.
  Length of the fibers: about 1 mm.
  Volume of pores: 73%.
  Specific weight: 0.6 to 6.0 g./cm.$^3$ The fibrous steel material may be made in a conventional, known manner and may be of any conventional type as known in the art.

While I have shown and described only one embodiment in accordance with the present invention, it is understood that the same is not limited thereto but is susceptible of numerous changes and modifications as known to a person skilled in the art. For example, the porosity can also be changed by changes in the dimensions of the fibers, i.e., by changes in the length and/or diameter thereof, and/or by changes in the concentration per surface unit.

Consequently, I do not wish to be limited to the details shown and described herein but intend to cover all such changes and modifications as are within the scope of those skilled in the art.

I claim:

1. A mixing skirt for the combustion chamber of a gas turbine drive unit which is exposed to high thermal loads and is cooled by a cooling gas flowing through said combustion chamber comprising a mat of rolled, highly heat resistant steel fibers having a predetermined compressed thickness and a selected pororitsy so as to permit passage therethrough of said cooling gas, and wherein said predetermined thickness and the porosity of said fibers vary in a step wise manner along the length of the mixing skirt.

2. A mixing skirt according to claim 1, wherein said rolled fibers have a diameter between 0.1 and 0.2 mm., a length of approximately 1 mm., and a specific weight of 0.6 to 6.0 grams per cubic centimeter.

3. A mixing skirt according to claim 1, wherein the thickness of the mat of fibers far exceeds the thickness of each individual fiber.

References Cited

UNITED STATES PATENTS

| | | | |
|---|---|---|---|
| 2,447,482 | 8/1948 | Arnold | 60—39.69 |
| 2,504,106 | 4/1950 | Berger | 60—39.69 |
| 2,857,657 | 10/1958 | Wheeler | 60—200A |
| 2,941,759 | 6/1960 | Rice et al. | 60—200A |
| 2,986,878 | 6/1961 | Townsend | 60—39.11 |
| 3,138,009 | 6/1964 | McCreight | 60—200A |
| 3,349,558 | 10/1967 | Smith | 60—39.65 |
| 3,173,470 | 3/1965 | Wright | 431—328 |
| 2,918,118 | 12/1959 | Schirmer | 431—352 |

CARLTON R. CROYLE, Primary Examiner

R. E. GLUCK, Assistant Examiner

U.S. Cl. X.R.

431—329